US010545255B2

(12) United States Patent
Nguyen

(10) Patent No.: US 10,545,255 B2
(45) Date of Patent: Jan. 28, 2020

(54) ACOUSTIC SIGNAL ATTENUATOR FOR LWD/MWD LOGGING SYSTEMS

(71) Applicant: HALLIBURTON ENERGY SERVICES, INC., Houston, TX (US)

(72) Inventor: Minh Dang Nguyen, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 377 days.

(21) Appl. No.: 15/021,478

(22) PCT Filed: Oct. 31, 2013

(86) PCT No.: PCT/US2013/067864
§ 371 (c)(1),
(2) Date: Mar. 11, 2016

(87) PCT Pub. No.: WO2015/065451
PCT Pub. Date: May 7, 2015

(65) Prior Publication Data
US 2016/0222780 A1 Aug. 4, 2016

(51) Int. Cl.
G01V 1/52 (2006.01)
(52) U.S. Cl.
CPC ............ G01V 1/523 (2013.01); G01V 1/52 (2013.01)
(58) Field of Classification Search
CPC ............ G01V 1/52; G01V 1/523; G01V 1/44
USPC .......................................... 181/102
See application file for complete search history.

(56) References Cited

U.S. PATENT DOCUMENTS

| 3,190,388 | A | | 6/1965 | Moser et al. |
| 4,850,450 | A | * | 7/1989 | Hoyle ............... G01V 1/523 181/102 |
| 5,510,582 | A | | 4/1996 | Birchak et al. |
| 5,728,978 | A | | 3/1998 | Roberts et al. |
| 5,796,677 | A | * | 8/1998 | Kostek ............... G01V 1/48 175/50 |
| 5,852,587 | A | | 12/1998 | Kostek et al. |

(Continued)

FOREIGN PATENT DOCUMENTS

WO    WO1998/016854    4/1998

OTHER PUBLICATIONS

Schlumberger, "SonicScope," 13-DR-0127, 2013, 7 pages.

(Continued)

Primary Examiner — Ian J Lobo
(74) Attorney, Agent, or Firm — Alan Bryson; Parker Justiss, P.C.

(57) ABSTRACT

One example of an acoustic signal attenuator for LWD/MWD logging systems can be implemented as an acoustic well logging tool positionable in a wellbore. The tool includes a longitudinal tool body. An acoustic signal transmitter and an acoustic signal receiver are mounted in the tool body and spaced longitudinally apart from each other. An acoustic signal attenuator which includes multiple slots formed in an outer surface of a portion of the tool body is positioned between the transmitter and the receiver. Each slot includes multiple protrusions extending from an inner surface of the slot into the slot. In operation, the multiple protrusions in each slot operate to attenuate an acoustic signal propagating from the transmitter to the receiver through the tool body.

20 Claims, 8 Drawing Sheets

(56) References Cited

U.S. PATENT DOCUMENTS

| | | | |
|---|---|---|---|
| 6,082,484 A * | 7/2000 | Molz | G01V 1/523 |
| | | | 181/102 |
| 6,470,275 B1 | 10/2002 | Dubinsky | |
| 6,588,267 B1 | 7/2003 | Bradley | |
| 6,643,221 B1 | 11/2003 | Hsu et al. | |
| 6,820,716 B2 * | 11/2004 | Redding | G01V 1/523 |
| | | | 175/50 |
| 6,850,462 B2 | 2/2005 | McDaniel et al. | |
| 6,899,197 B2 | 5/2005 | Arian et al. | |
| 7,048,089 B2 * | 5/2006 | West | G01V 1/16 |
| | | | 181/105 |
| 7,216,737 B2 * | 5/2007 | Sugiyama | G01V 1/523 |
| | | | 181/102 |
| 7,970,544 B2 * | 6/2011 | Tang | G01V 1/50 |
| | | | 166/250.01 |
| 7,984,771 B2 | 7/2011 | Pabon et al. | |
| 7,997,380 B2 | 8/2011 | Arian et al. | |
| 8,220,583 B2 * | 7/2012 | Botting | G01V 1/523 |
| | | | 181/102 |
| 2004/0141415 A1 * | 7/2004 | Redding | G01V 1/523 |
| | | | 367/76 |
| 2011/0073368 A1 | 3/2011 | Han et al. | |
| 2011/0080806 A1 | 4/2011 | Normann | |
| 2013/0037259 A1 | 2/2013 | Cavender | |
| 2013/0170318 A1 | 7/2013 | Valenza et al. | |
| 2013/0239673 A1 | 9/2013 | Garcia-Osuna et al. | |

OTHER PUBLICATIONS

Halliburton, "BAT™ Bimodal AcousTic LWD Sonic Tool," H02485, May 2012, 2 pages.
Weatherford®, "ShockWave® Sonic Tool," 6526.02, 2011-2013, 5 pages.
Schlumberger, "SonicVision," 09-DR-0319, 2010, 7 pages.
International Search Report/Written Opinion issued by KIPO dated Jul. 24, 2014, 15 pages.

* cited by examiner

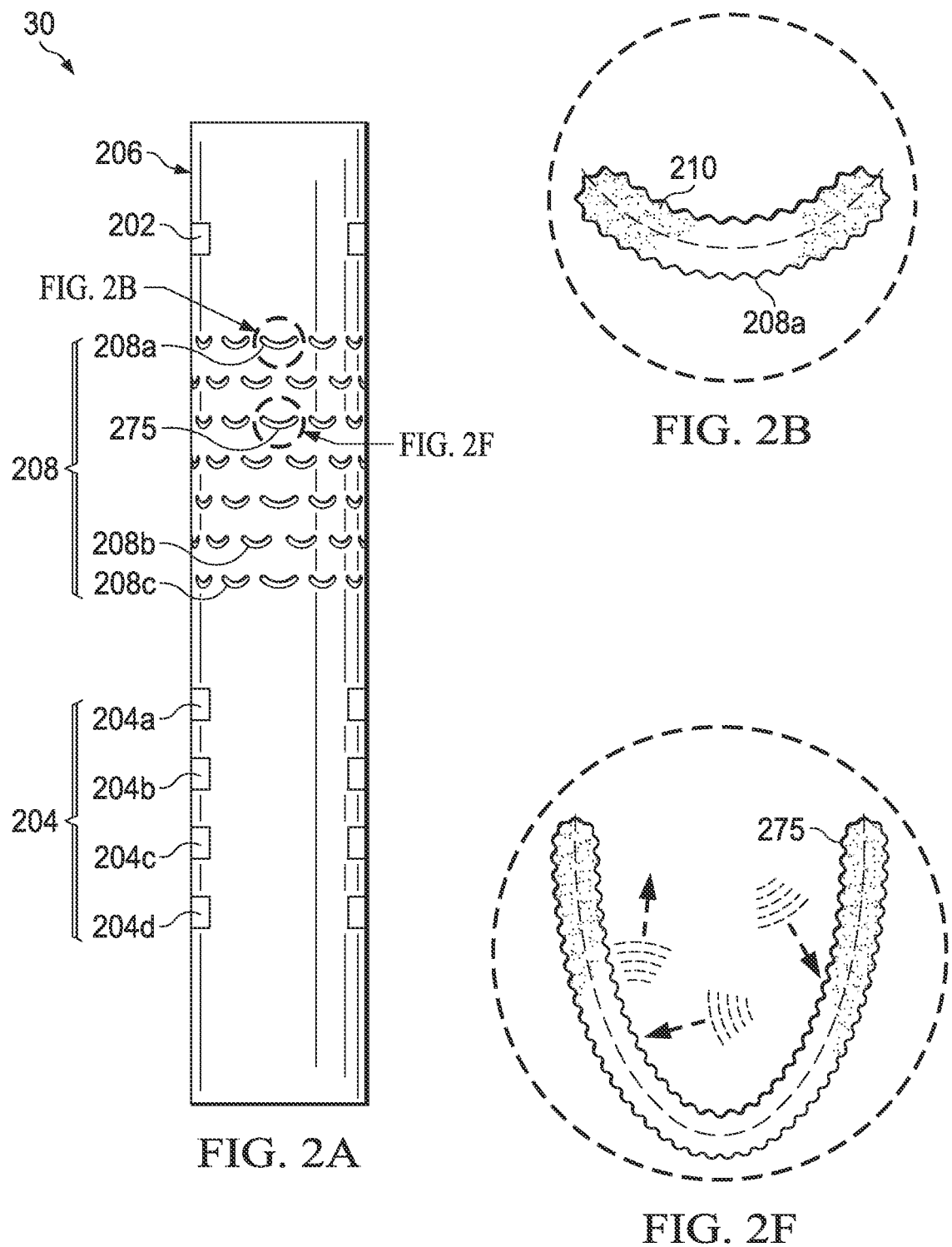

ACOUSTIC SIGNAL ATTENUATOR FOR LWD/MWD LOGGING SYSTEMS

TECHNICAL FIELD

This disclosure relates to logging while drilling (LWD) or measurement while drilling (MWD) logging systems implemented in wellbores.

BACKGROUND

In connection with the recovery of hydrocarbons from the earth, wellbores are generally drilled using a variety of different methods and equipment. According to one common method, a roller cone bit or fixed cutter bit is rotated against the subsurface formation to form the wellbore. The drill bit is rotated in the wellbore through the rotations of a drill string attached to the drill bit and/or by the rotary force imparted to the drill bit by a subsurface drilling motor powered by the flow of drilling fluid down the drill string and through downhole motor. In some situations it is desirable to evaluate the formations being drilled while drilling is conducted. Various instruments are run in the drill string to measure parameters that may be used to evaluate the formation(s). Such systems are often referred to as logging while drilling (LWD) and measurement while drilling (MWD).

Acoustic logging tools can be used in MWD and LWD systems to measure acoustic properties of the formations from which images, mechanical properties or other characteristics of the formations can be derived. Acoustic energy is generated by a logging tool and acoustic waves comprising periodic vibrational disturbances resulting from the acoustic energy propagating through the formation or the acoustic logging system are received by an acoustic receiver in the acoustic logging tool. Acoustic waves can be characterized in terms of their frequency, amplitude and speed of propagation. Acoustic properties of interest for formations can include compressional wave speed, shear wave speed, surface waves speed (e.g. Stoneley waves) and other properties. Acoustic images can be used to depict wellbore wall conditions and other geological features away from the wellbore. The acoustic measurements have applications in seismic correlation, petrophysics, rock mechanics and other areas. An effective operation of the acoustic logging tools can be hindered by undesirable noise signals encountered downhole by the logging tools.

DESCRIPTION OF DRAWINGS

FIGS. 2A-2F illustrate example acoustic well logging tools implemented downhole in the wellbore of FIG. 1.

Like reference symbols in the various drawings indicate like elements.

DETAILED DESCRIPTION

This disclosure describes acoustic signal attenuators for LWD/MWD logging systems. Acoustic measurement systems (acoustic well logging tools) are implemented in LWD and wireline logging applications. In one example of implementing an acoustic well logging tool positioned in a wellbore, an acoustic signal transmitter mounted in the acoustic well logging tool transmits an acoustic signal (or acoustic wave). The acoustic signal propagates through the zone (e.g., a formation, multiple formations or a portion of a formation) through which the wellbore is being or has been drilled. An acoustic signal receiver mounted in the acoustic well logging tool receives acoustic responses, which includes one or more acoustic signals from the formation. The acoustic signal receiver can include an array of receivers, and can record the acoustic responses. The responses can be used to determine the compressional and shear wave velocities (as well as slowness) through the formation.

In addition to the acoustic responses from the formation, the acoustic signal receiver also receives undesirable acoustic signals which affect the accuracy of the compressional and shear wave velocity measurements. A portion of an acoustic signal that propagates from the transmitter to the receiver through the acoustic well logging tool itself (known as tool mode) is an example of such an undesirable acoustic signal. The tool mode, consequently, interferes with the compressional and shear wave arrivals, thereby reducing the quality and accuracy of the readings. Other examples of undesirable acoustic signals, in an acoustic well logging, tool implemented with an LWD logging system, include acoustic signals from drilling noises such as vibration of drill bits, impact between drill string and wellbore, circulation of drilling mud, and acoustic signals from other sources of noise in the wellbore.

This disclosure describes an acoustic signal attenuator that can be implemented to decrease (e.g., minimize or eliminate) undesirable acoustic signals propagated through the acoustic well logging tool, e.g., the tool mode. The techniques can be directly applied to LWD and MWD acoustic/sonic tools that attenuate the tool mode, drilling noises, and other undesirable acoustic signals white drilling. The attenuator can be implemented in any application in which acoustic waves transmitted between a transmitter and receiver fixed longitudinally apart on the same tool body, are to be isolated. Implementing the techniques described here can increase an efficiency of the attenuator and reduce a length of the tool resulting in increase in production speed, decrease in production cost, decrease in manufacturing issues and increase in log data quality. The reduced tool mode can also increase the range of formation slowness that the well logging tool can measure (e.g. formation with faster compressional and shear wave speed).

Figure 1:
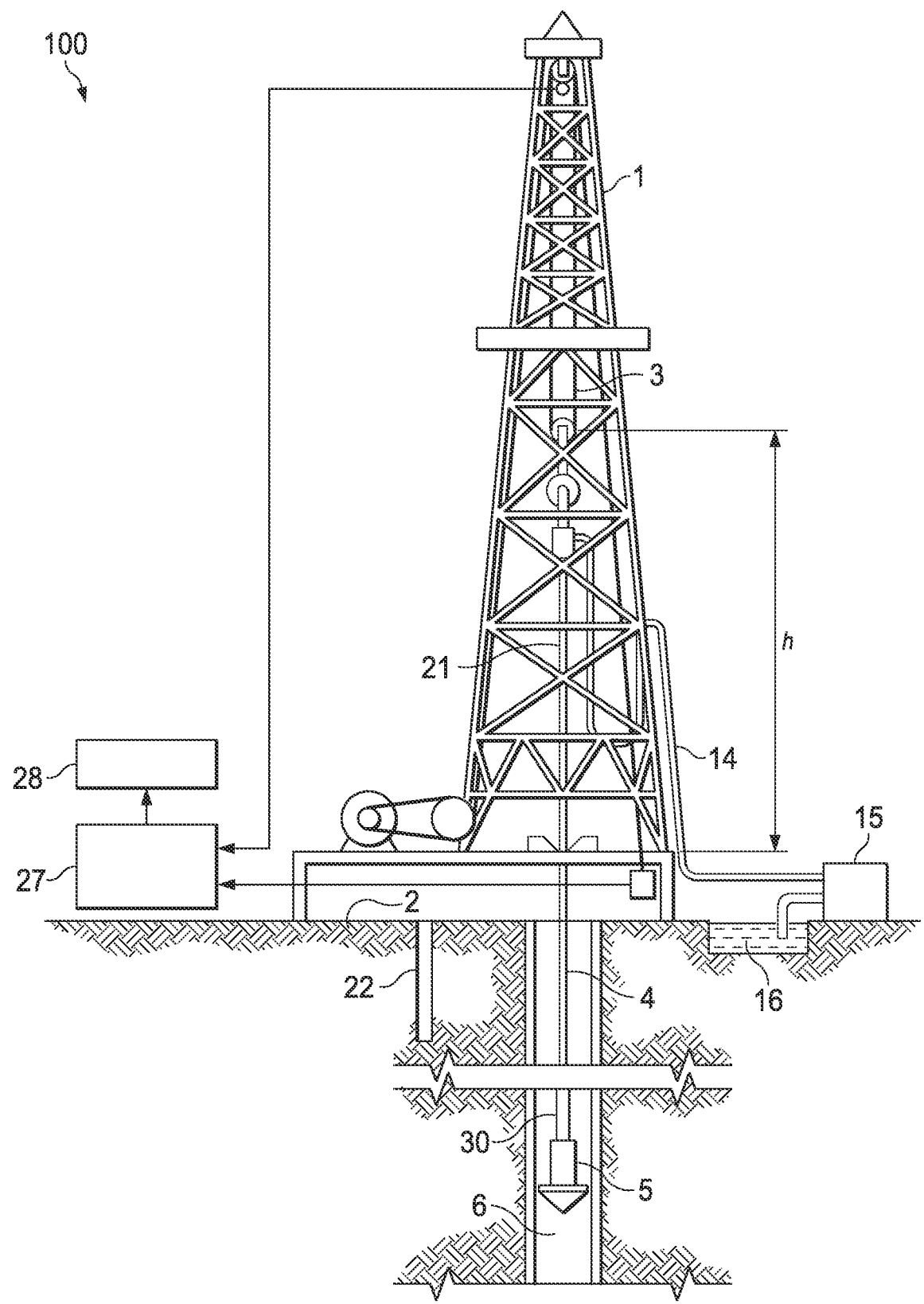
FIG. 1 illustrates an example downhole acoustic well logging tool implemented in an example drilling rig.

FIG. 1 is a schematic drawing of a drilling rig 100 and a drill string 4 which includes an acoustic well logging tool 30 positioned in a wellbore 6. The rotary drilling rig 100 can include a mast 1 rising above ground 2 and fitted with lifting equipment 3. A drill string 4 is formed of drill pipes attached end to end (e.g., threadingly or otherwise), and is suspended into the wellbore 6. A drill bit 5 is attached to the downhole end of the drill string 4 to drill the wellbore 6. The drill string 4 is connected to a mud pump 15 (e.g., through a hose 14), which permits the injection of drilling mud into the wellbore 6 through the drill string 4. The drilling mud can be drawn from a mud pit 16 which can be fed with surplus mud from the wellbore 6. During drilling operations, the drill string 4 can be driven in a rotary motion by means of a kelly 21 fitted to an upper end of the drill string 4 or alternatively by a top drive unit (not shown) or downhole drilling motor (not shown).

Figure 2C:
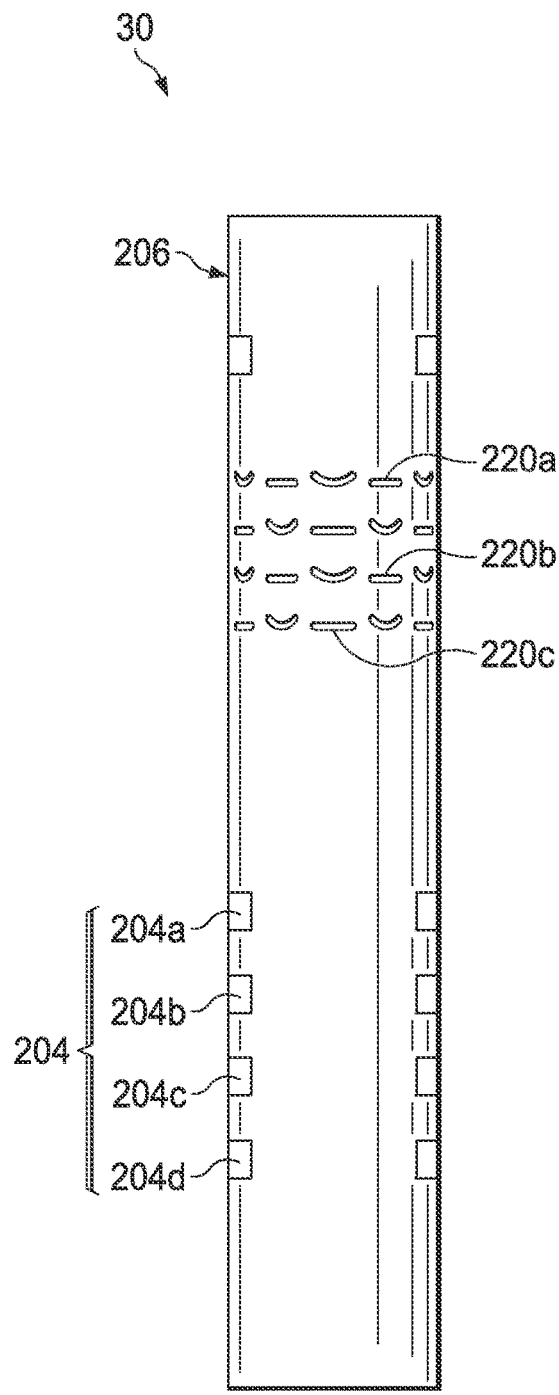

FIGS. 2A-2F illustrate example implementations of acoustic well logging tools that can be implemented downhole in wellbores, e.g., the wellbore of FIG. 1. One or more tools (e.g., an LWD tool, an MWD tool, a wireline tool) can be attached to the drill string 4 and positioned downhole in the wellbore 4. FIG. 2A is a plan view of some implementations of an acoustic well logging tool 30 positionable in the wellbore 6 and attachable (e.g., serially) to the one or more tools. As shown in FIG. 2A, the acoustic well logging tool 30 can include a longitudinal tool body 206. An acoustic signal transmitter 202 can be mounted in the tool body 206. An acoustic signal receiver 204 can be mounted in the tool body 206 and spaced longitudinally apart from the transmitter 202. In some implementations, the acoustic signal transmitter 202 can be closer to a surface of the wellbore 6 relative to the acoustic signal receiver 204, while in other implementations, the transmitter 202 can be closer to the drill bit 5 relative to the receiver 204.

An acoustic signal attenuator 208 is formed in an outer surface of a portion of the tool body 206 between the transmitter 202 and the receiver 204. The acoustic signal attenuator 208 includes multiple slots (e.g., a first slot 208a, a second slot 208b, a third slot 208c, and other slots). FIG. 2B is a plan view of an example slot included in the tool body 206 illustrated in FIG. 2A. The slot illustrated in FIG. 2B includes multiple protrusions that extend from an inner surface of the slot into the slot. Similarly, each slot included in the tool body 206 includes multiple protrusions that extend from an inner surface of each slot into each slot. The multiple protrusions result in an uneven (e.g., wavy) profile for each slot. As described below, the multiple protrusions in each slot operate to attenuate an acoustic signal transmitted from the transmitter 202 to the receiver 204 along the tool body 206.

Figure 4A:
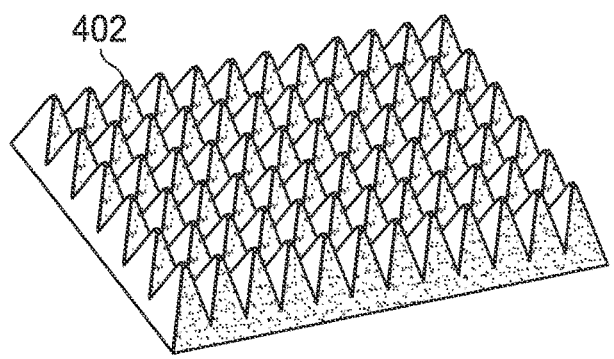
FIGS. 4A-4D illustrate examples of protrusions formed on inner surfaces of slots formed on the tool body of the acoustic logging tool of FIG. 1.

The multiple protrusions can have different profiles. For example, each of FIGS. 4A and 4D are perspective views of the multiple protrusions formed as arrays of protrusions. As shown in FIG. 4A, each protrusion 402 in the array can terminate at a sharp edge. Alternatively, as shown in FIG. 4D, each protrusion 408 can terminate at a round edge. For example, the protrusions in the array shown in FIG. 4D can be formed by using a surface function (e.g., z=sin (x)·sin (y)), In some implementations, an array of protrusions can include a combination of one or more protrusions terminating at a sharp edge and one or more protrusions terminating at a round edge.

Figure 4B:
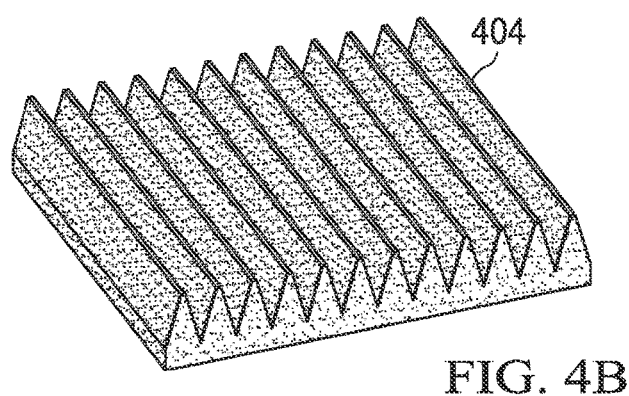
Figure 4C:
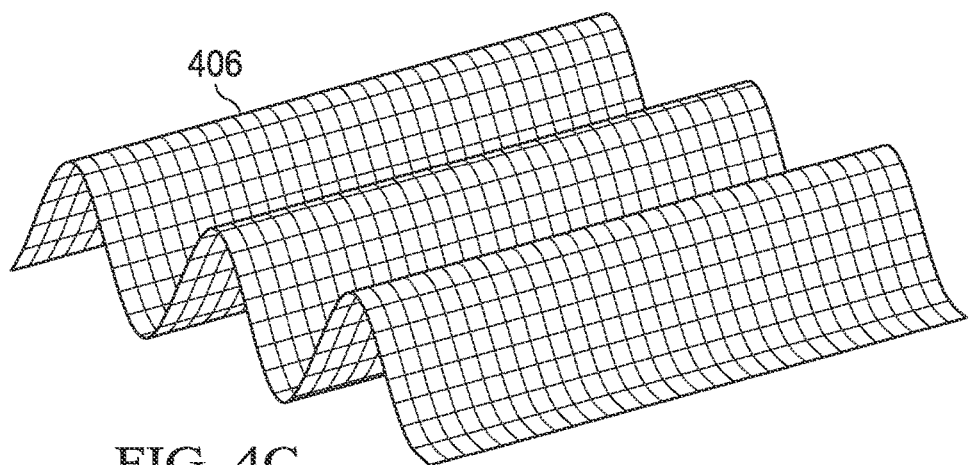
Figure 4D:
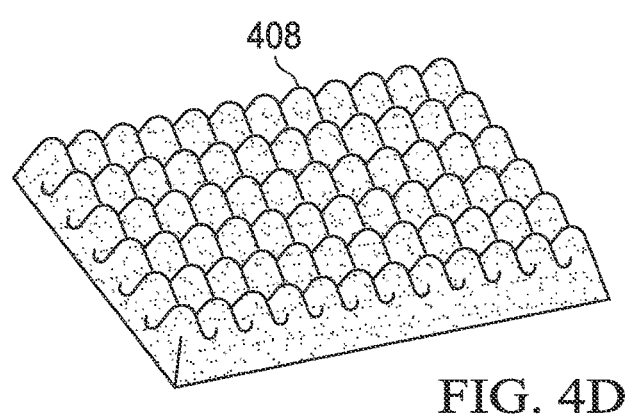

Each of FIGS. 4B and 4C are perspective views of the multiple protrusions formed as multiple peaks and valleys arranged adjacent to each other. As shown in FIG. 4B, each peak of a protrusion can terminate at a sharp edge 404. Alternatively, as shown in FIG. 4C, each peak of a protrusion can terminate at a curved edge 406 giving the multiple protrusions a wavy appearance. The arrangement of the protrusions in the array or as the multiple peaks/valleys can be uniform or non-uniform. For example, the protrusions in an array can be equidistant or not from each other. Each of the heights of the protrusions, the amplitudes of the peaks and valleys, or the wavelengths of peaks/valleys can be equal or not to each other. Thus, in general, any arrangement of protrusions in the inner surface of the slot to form the multiple protrusions is possible.

The multiple protrusions (FIGS. 4A-4D) can be formed by any material processing techniques, e.g., casting, forging, drilling, pressing, or other techniques. The protrusions are intentionally formed in the inside surface of each slot. The protrusions can be formed by using a core during casting process. For collar that is forged for higher mechanical strength, the slot and protrusions can be formed by milling or electrical discharge machining. The wavy surfaces of the protrusion increase the attenuation efficiency by refracting the acoustic energy to be absorbed by the attenuating material multiple times before the acoustic energy is reflected back. Consequently, the acoustic energy is reduced for reflected waves. The quality of attenuation can increase as the peak-valley distance or the number of the protrusions (or both) increases. The dimension and number of the protrusions can be selected to decrease or minimize stress concentration on the tool.

In some implementations, one or more or all of the multiple slots can be filled with a noise attenuating material. The noise attenuating material (e.g., a polymeric material such as rubber, foam, a mixture of a polymeric material and noise-absorbing particles, or other material that can absorb an acoustic signal) can fill an entirety of a slot or only a portion of a slot. The material with higher acoustics energy absorption rate will result in higher the attenuation efficiency.

In some implementations a slot can be straight, while, in other implementations such as those shown in FIG. 2A, each of the multiple slots can be an arcuate slot. That is, each slot can be curved and have a radius of curvature. For example, FIG. 2F is plan view of an example parabolic slot 275 in which incoming acoustic energy is reflected in a portion of the slot between the peak and the valley before being reflected in the direction of the transmitter 202. Further, each arcuate slot can be concave and curve away from the transmitter 202. The radius of curvature of the arcuate slot can be sufficient to attenuate the acoustic signal transmitted from the transmitter 202 to the receiver 204 along the tool body. As the distance between the peak and valley of the arcuate slot increases, a quantity of the acoustic energy that is refracted and absorbed by the attenuation material before being reflected in the transmitter direction also increases, resulting in an increase in the acoustic energy attenuation.

The symmetry of the slots also makes the reflected waves interfere each other and reduce their amplitude. Compared to a straight slot that spans a same length on the tool body 206, the cross-section of the arcuate slot occupies a greater area resulting in an increase in a second moment of area and polar second moment of area of the acoustic well logging tool 30. Consequently, a strength of the acoustic well logging tool 30 to bear the moment and torque, e.g., transferred from the drill string 4, can be higher for an arcuate slot relative to a straight slot. Two or more of the arcuate slots can be identical to each other (i.e., have the same slot width and radius of curvature). Alternatively or in addition, some of the arcuate slots can be identical to each other while others are different from each other (i.e., have either different slot widths or have different radii of curvature or both).

The multiple slots can be disposed at multiple positions in the portion of the tool body 206 between the transmitter 202 and the receiver 204. Each slot can occupy a respective position, which can span a portion of an outer surface of the tool body 206. For example, multiple slots can be arranged circumferentially around a cross-sectional surface of the tool body 206. Multiple such cross-sectional surfaces of the tool body 206 can be formed, each cross-sectional surface including respective multiple slots. The multiple cross-sectional surfaces can be stacked along an axis of the tool body 206 between the transmitter 202 and the receiver 204 resulting in the multiple slots.

In some implementations, a slot can span an entire thickness of the outer surface of the tool body 206 such that the slot is a hole through the outer surface of the tool body 206. For example, one or more or all of the slots can span an entire thickness of the outer surface of the tool body 206 in implementations in which the acoustic tool 30 is connected to a tool (e.g., a wireline tool or other tool) in which forming through holes in the longitudinal body may not significantly decrease the tool strength.

Alternatively, a slot can be formed on an outer surface of the tool body 206 to span a portion of the thickness of the tool body 206. In such implementations, the slot does not span the entire thickness of the outer surface of the tool body 206. In some implementations, the slot can be formed on an inner surface of the tool body 206 to span a portion of the thickness of the tool body 206. Also, some of the slots can be formed on the outer surface of the tool body 206 while others can be formed in the inner surface.

Figure 2D:
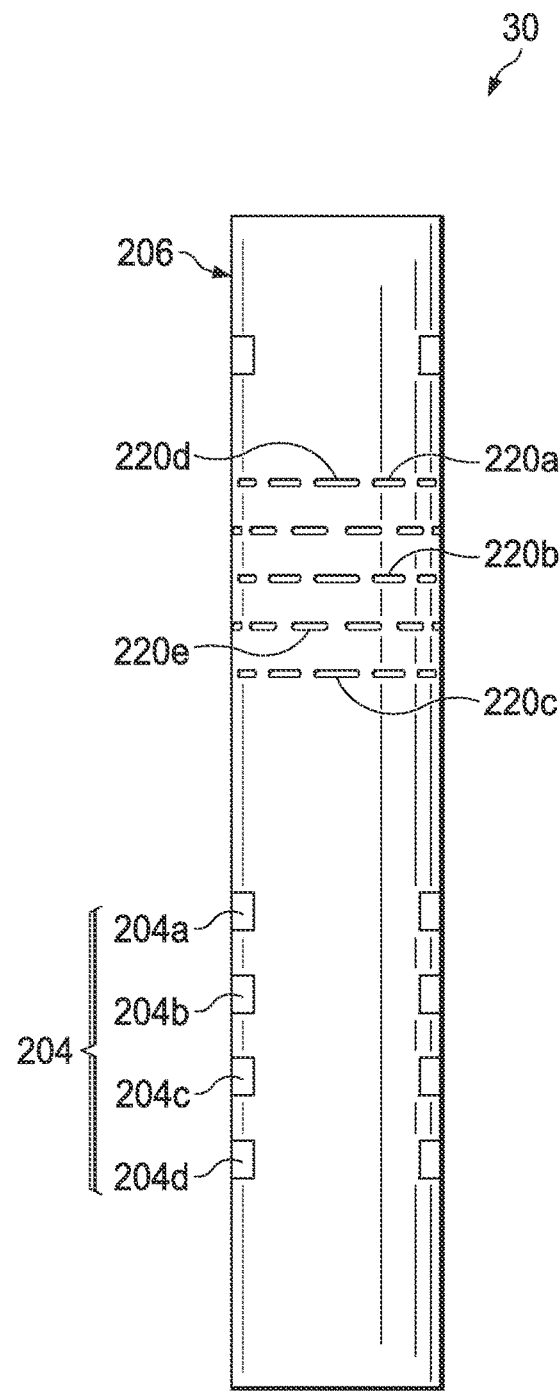
Figure 2E:
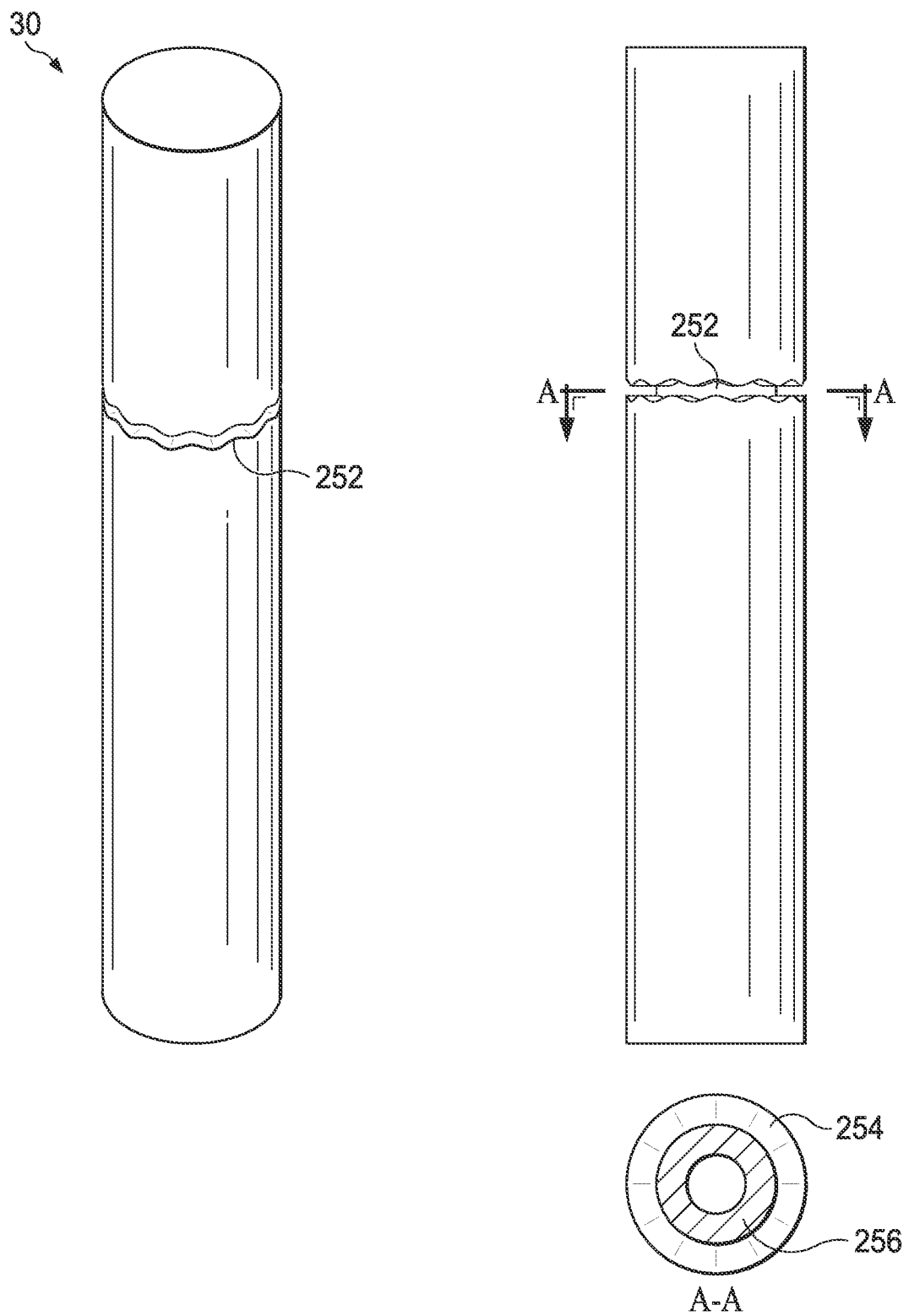

FIG. 2E is a perspective and plan view of some implementations of the tool body 206 in which the tool body 206 includes a single slot. For example, the multiple slots illustrated in FIG. 2A can be replaced by a single slot 252 that spans all or almost all (e.g., 50% of more) of the circumference of the tool body 206 and that spans less than an entirety of the thickness of the tool body 206. A cross-sectional view of the tool body 206 shows an annulus 256 through which the drilling mud flows and across-sectional view a slot 254 that spans the entire circumference of the tool body 206. In such implementations, all or almost all of an inner surface of the slot can include multiple protrusions such as those described above. The noise attenuating material may not or can be included in an entirety of or a portion of the single slot 252. For example, one or more or all of the slots can span a portion of the thickness of the tool body 206 in implementations in which the acoustic tool 30 is connected to a tool (e.g., an LWD tool) in which forming through holes in the longitudinal body may decrease the tool strength to a level below a strength at which the tool can operate. The tool strength can include, e.g., a resistance to bending or torsion (or both), resistance to tensile or compressive forces (or both), or combinations of them. In some implementations, some of the slots can span the entire thickness of the tool body 206 while others can span less than the entire thickness of the tool body 206.

FIG. 2C is a plan view of some implementations of the tool body 206 in which the multiple slots formed on the tool body 206 include a combination of arcuate slots and straight slots (e.g., the arcuate slots 208a, 208b, 208c, the straight slots 220a, 220b, 220c, and other arcuate or straight slots). FIG. 2D is a plan view of some implementations of the tool body 206 in which the multiple slots formed on the tool body 206 include only straight slots (e.g., the straight slots 220a, 220b, 220c, 220d, 220e, and other straight slots). In the implementations shown in each of FIGS. 2C and 2D, one or more or all of the slots can include the multiple protrusions described above. Also, one or more or all of the slots can include the noise attenuating material described above. The slots shown in FIGS. 2C and 2D can span the entire thickness of the tool body 206, Alternatively, the slots can span a portion of the entire thickness of the tool body 206.

Figure 3A:
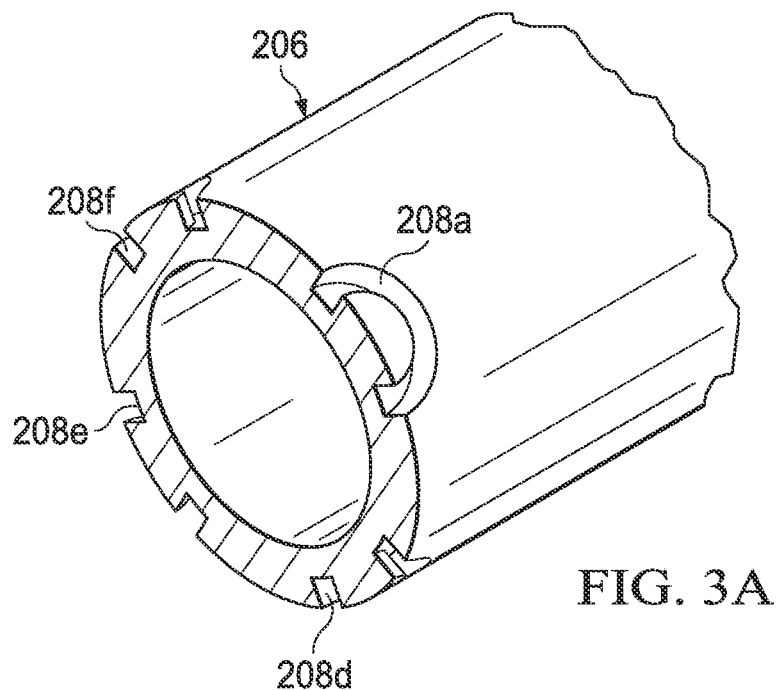
FIGS. 3A and 3B illustrate perspective views of slots formed on an outer surface of a tool body of the acoustic logging tool of FIG. 1.
Figure 3B:
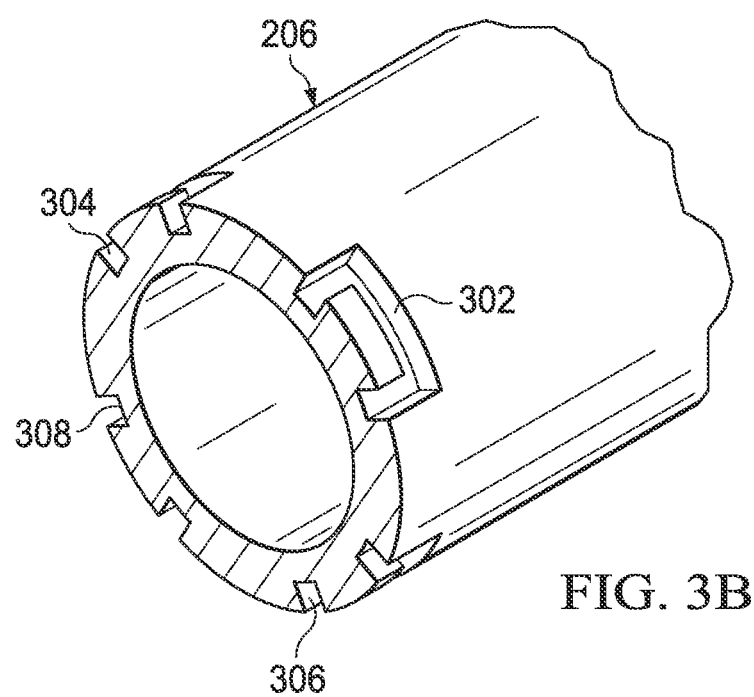

FIG. 3A is a perspective view of a portion of the tool body 206 including multiple arcuate slots (e.g., arcuate slots 208a, 208d, 208e, 208f) that span a portion of the entire thickness of the toot body 206. FIG. 3B is a perspective view of a portion of the tool body 206 including multiple straight slots (e.g., 302, 304, 306, 308). In some implementations, some slots can be formed as holes in the toot body 206 white other slots span less than an entire thickness of the tool body 206.

The ratio between the portion of the thickness that a slot spans and an entire thickness of the tool body 206 can be sufficient to improve acoustic signal attenuation while maintaining strength of the tool body 206 to withstand downhole conditions in the wellbore 6 while operating. In some implementations, the thickness of the tool body in which the slot is formed can be determined based on the yield strength of the tool body material, working temperature, torque/moment rating, diameter of tool body and other parameters. In implementations in which the slots span a portion of the thickness of the tool body 206, the depths of all the slots can be the same. Alternatively, some of the slots can be formed to have different depths from others.

Figure 5:
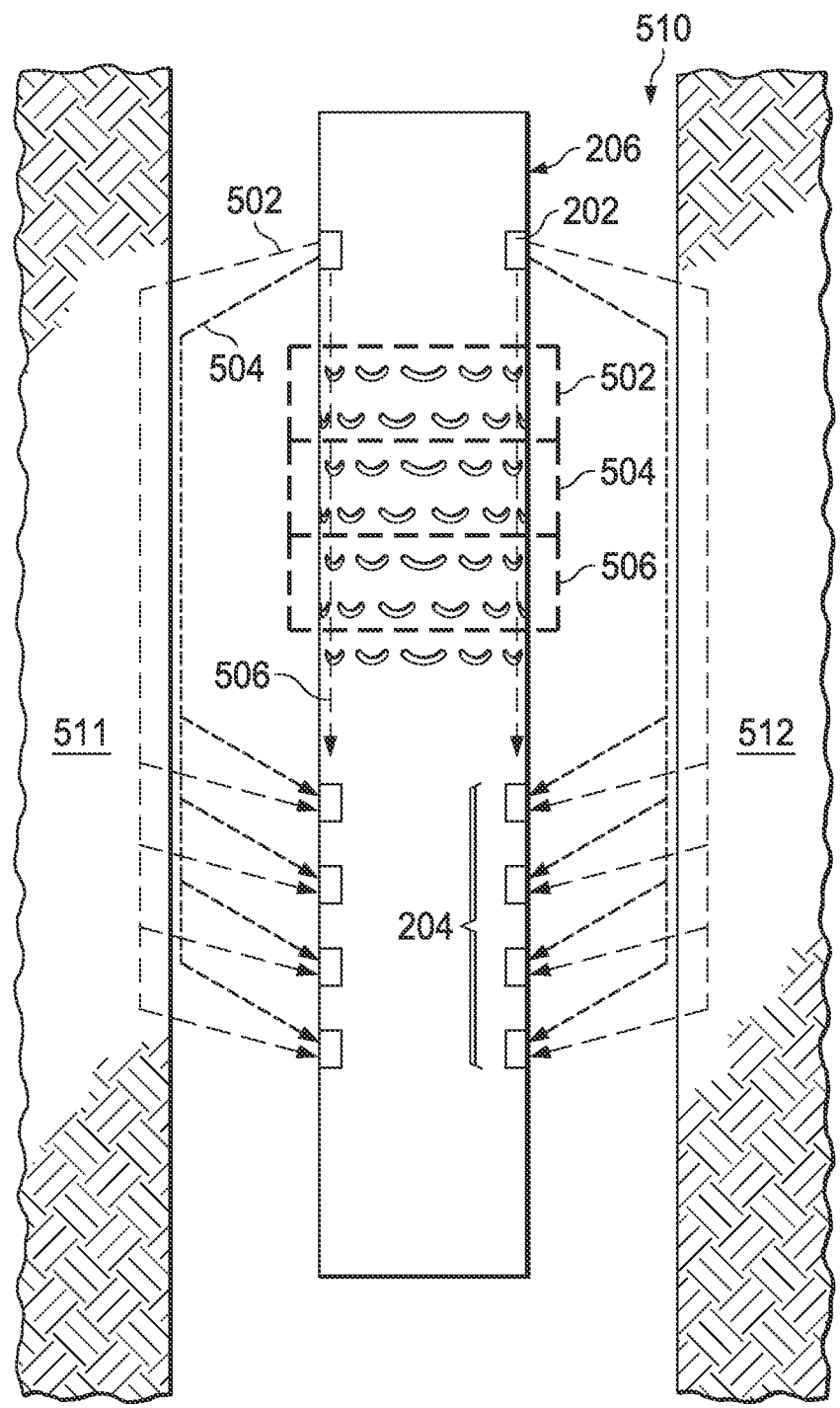
FIG. 5 illustrates an example of zone including a well in which the acoustic logging tool of FIG. 1 is positioned.

FIG. 5 is a plan view of an example of a zone of interest 512 adjacent to a well bore 510 in which the acoustic logging tool 30 is positioned. The transmitter 202 generates multiple acoustic signals. A portion of the signals 502 can travel into the zone 512, pass through a portion of the zone, and then pass back out into the well bore and be received as acoustic signal data by the receiver 204. This portion of the signals 502 can be data that be used to evaluate the zone. Another portion of the signals 504 can strike the wall 511 of the wellbore, be reflected back and be received by the receiver 204 as the acoustic signal data. Another portion of the signals 506 can travel through the tool body 206 from the transmitter 202 to the receiver 204. These signals can represent the acoustic signal data that is referred to as tool mode signals.

Figure 6:
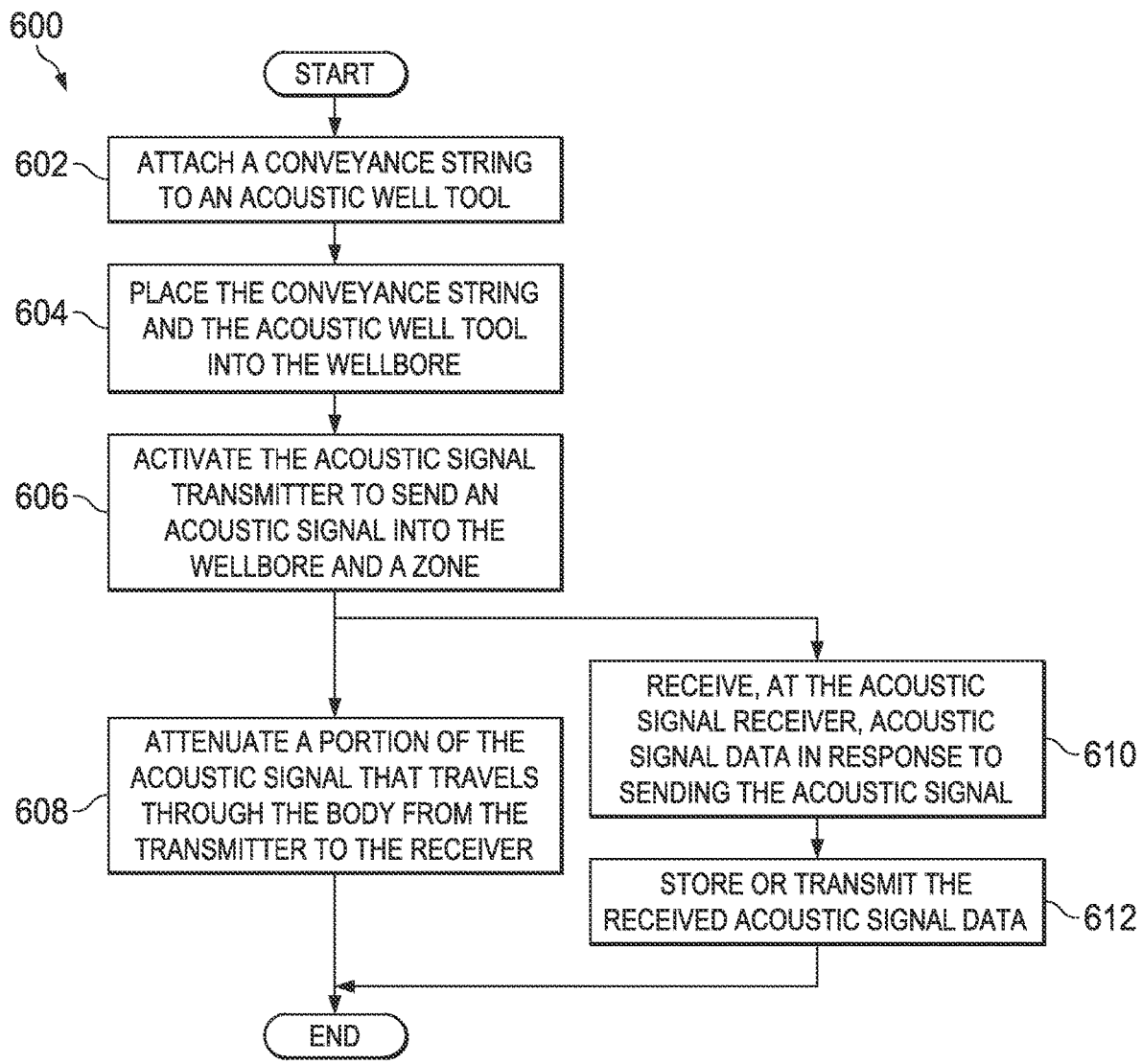
FIG. 6 is a flowchart of an example process to attenuate acoustic signals using the acoustic logging tool of FIG. 1.

FIG. 6 is a flowchart of an example process 600 to attenuate acoustic signals using the acoustic logging tool of FIG. 1. In some implementations, the acoustic logging tool 30 can implement at least a portion of the process 600 to attenuate a tool mode acoustic signal. At 602, the acoustic well logging tool is attached to a conveyance string (e.g., a drill string, a wireline, an acoustic line, or other string that can be positioned downhole in the wellbore 510). As described above, the acoustic tool includes the longitudinal body 206, the transmitter 202 mounted in the tool body 206 and the receiver 206 mounted in the tool body 206 and spaced longitudinally apart from the transmitter. In some implementations, the receiver includes a receiver array (e.g., receivers 204a, 204b, 204c, 204d) to receive the acoustic signals transmitted from the transmitter through the formation. The acoustic signal attenuator 208 includes multiple slots (such as those described above), which are disposed radially around or longitudinally along the portion of the tool body between the transmitter 202 and the receiver 204. In some implementations, the multiple slots can be arranged in stages (e.g., a first stage 502, a second stage 504, a third stage 506) arranged serially between the transmitter 202 and the receiver 204. Each stage can include one or more slots. A first stage formed nearer the receiver 204 can attenuate the acoustic signal more than the second stage formed nearer the transmitter.

At 604, the conveyance string and the acoustic well logging tool are placed into the wellbore proximal to the zone 512, which, as described above, can include a geologic formation, multiple geologic formations or a portion of a geologic formation. At 606, the acoustic signal transmitter is activated to send an acoustic signal into the zone 512.

At 608, a portion of the acoustic signals generated by the acoustic signal transmitter that travels through the tool body (i.e., the tool mode) is attenuated by the acoustic signal attenuator. Because the tool body 206 is metallic (e.g., made from rigid steel), the tool mode noise signal travels through the tool body 206 to the receiver 204 at a high speed thereby interfering with compressional and shear waves that arrive at the receiver 204 from the zone 512. The acoustic signal attenuator operates such that the multiple protrusions on the inner surfaces of the slots, the polymeric materials that fill all or portions of the slots or the arcuate nature of the slots (or combinations of them) refract the acoustic energy into the slot multiple times and reflect the rest. In implementations in which one or more of the slots are arcuate, the reflected acoustic signals converge and interfere with the acoustic signals that propagate through the tool body 206, thereby reducing the amplitude of the propagating acoustic signals. As the acoustic signal propagates through the multiple stages in which the multiple slots of the acoustic signal attenuator are arranged, the acoustic signal (e.g., the tool mode) either decreases to below an acceptable threshold or is eliminated (or both). In this manner, the acoustic signal attenuator can trap the acoustic noise signals such as the tool mode noise signals and attenuate such signals.

At 610, the acoustic signal receiver 204 receives acoustic signal data from the zone 512. The acoustic signal data is generated in response to the acoustic signal that the acoustic signal transmitter 202 transmits. For example, the acoustic signal data can include acoustic signals 502 that propagated through the zone 512 before reaching the receiver 204, acoustic signals that propagated through the tool body 206 (e.g. tool mode noise signals) before reaching the receiver 204, acoustic signals 504 that propagated through the wellbore 510 before reaching the receiver 204, acoustic signals from other sources (e.g., the drill bit, mud motor, or other sources) that propagated through the tool body 206 before reaching the receiver 204 or combinations of them. At 612, the received acoustic signal data is stored or transmitted for subsequent data processing, by the receiver 204.

A number of implementations have been described. Nevertheless, it will be understood that various modifications may be made without departing from the spirit and scope of the disclosure.

The invention claimed is:

1. An acoustic well logging tool positionable in a wellbore, the tool comprising:
a longitudinal tool body;
an acoustic signal transmitter mounted in the tool body;
an acoustic signal receiver mounted in the tool body and spaced longitudinally apart from the transmitter; and
an acoustic signal attenuator including a plurality of slots formed in an outer surface of a portion of the tool body between the transmitter and the receiver, each slot defining an interior surface substantially covered with a plurality of protrusions extending therefrom.

2. The well logging tool of claim 1, wherein the plurality of protrusions are configured to attenuate an acoustic signal transmitted from the transmitter to the receiver along the tool body.

3. The well logging tool of claim 1 wherein the plurality of slots are disposed at a plurality of positions in the portion of the tool body between the transmitter and the receiver.

4. The well logging tool of claim 3, wherein the plurality of positions form a plurality of stages arranged serially between the transmitter and the receiver, each stage comprising one or more slots of the plurality of slots, and wherein a first stage formed nearer the receiver attenuates the acoustic signal more than a second stage formed nearer the transmitter.

5. The well logging tool of claim 1, further comprising noise attenuating material positioned in the slot.

6. The well logging tool of claim 5, wherein the noise attenuating material comprises polymeric material.

7. The well logging tool of claim 5, wherein the noise attenuating material fills an entirety of the slot.

8. The well logging tool of claim 1, wherein each of the plurality of slots comprises an arcuate slot.

9. The well logging tool of claim 8, wherein the arcuate slot is concave and curves away from the transmitter.

10. The well logging tool of claim 8, wherein a radius of curvature of the arcuate slot is configured to attenuate the acoustic signal transmitted from the transmitter to the receiver along the tool body.

11. The well logging tool of claim 8, wherein at least two arcuate slots of the plurality of arcuate slots are identical to each other.

12. The well logging tool of claim 1, wherein the plurality of slots are disposed radially around the portion of tool body between the transmitter and receiver.

13. The well logging tool of claim 1, wherein the plurality of slots are disposed longitudinally along the portion of the tool body between the transmitter and the receiver.

14. The well logging tool of claim 1, further comprising a logging while drilling (LWD) tool or a wireline tool.

15. The well logging tool of claim 1, wherein the receiver comprises a receiver array to receive acoustic signals transmitted from the transmitter through a geologic formation.

16. A method of obtaining acoustic data from a wellbore drilled into a zone of a geologic formation, said method comprising:
attaching a well acoustic well logging tool to a conveyance string, the acoustic well logging tool including:
a longitudinal tool body;
an acoustic signal transmitter mounted in the tool body;
an acoustic signal receiver mounted in the tool body and spaced longitudinally apart from the transmitter; and
an acoustic signal attenuator including a plurality of slots formed in an outer surface of a portion of the tool body between the transmitter and the receiver, each slot defining an interior surface substantially covered with a plurality of protrusions extending therefrom;
placing the conveyance string and the acoustic well logging tool into the well bore proximal to the zone;
activating the acoustic signal transmitter and generating a plurality of acoustic signals;
sending portions of the acoustic signals into the wellbore and the zone;
attenuating a portion of the acoustic signals generated by the acoustic signal transmitter that travels through the tool body with the acoustic signal attenuator;
receiving, by the acoustic signal receiver, acoustic signal data from the zone, the acoustic signal data generated in response to the acoustic signal transmitted by the acoustic signal transmitter; and
storing or transmitting the received acoustic signal data for subsequent data processing.

17. The method of claim 16, wherein attenuating the portion of the acoustic signal generated by the acoustic signal transmitter that travels through the tool body with the acoustic signal attenuator comprises:
disposing the plurality of slots at a plurality of positions in the portion of the tool body between the transmitter and the receiver; and
serially arranging the plurality of positions to form a plurality of stages, each stage comprising one or more slots of the plurality of slots, and wherein a first stage formed nearer the receiver attenuates the acoustic signal more than a second stage formed nearer the transmitter.

18. The method of claim 16, wherein attenuating the portion of the acoustic signal generated by the acoustic signal transmitter that travels through the tool body with the acoustic signal attenuator comprises positioning noise attenuating material in each slot.

19. The method of claim 16, wherein the conveyance string is at least one of a drill string, a wireline, or an electric line.

20. The method of claim 16, wherein each slot of the plurality of slots comprises an arcuate slot that is concave and curves away from the transmitter.

* * * * *

UNITED STATES PATENT AND TRADEMARK OFFICE
CERTIFICATE OF CORRECTION

| | | |
|---|---|---|
| PATENT NO. | : 10,545,255 B2 | Page 1 of 1 |
| APPLICATION NO. | : 15/021478 | |
| DATED | : January 28, 2020 | |
| INVENTOR(S) | : Minh Dang Nguyen | |

It is certified that error appears in the above-identified patent and that said Letters Patent is hereby corrected as shown below:

In the Specification

In Column 1, Line 29, after --Acoustic-- delete "togging" and insert --logging--

In Column 1, Line 36, delete "togging" and insert --logging--

In Column 2, Line 42, after --acoustic signals-- delete "white" and insert --while--

In Column 5, Line 28, after --mud flows and-- delete "across-sectional" and insert --a cross-sectional--

In Column 5, Line 65, after --of the-- delete "toot" and insert --tool--

In Column 6, Line 1, after --holes in the-- delete "toot body 206 white" and insert --tool body 206 while--

In Column 7, Line 34, after --data processing,-- insert --e.g.,--

Signed and Sealed this
Tenth Day of March, 2020

Andrei Iancu
*Director of the United States Patent and Trademark Office*